United States Patent
Liscano et al.

(10) Patent No.: US 7,339,907 B2
(45) Date of Patent: Mar. 4, 2008

(54) SYSTEM AND METHOD FOR THE SELECTION OF ELECTRONIC SERVICES FROM A SET OF RESOURCES USING INFRARED COMMUNICATION

(75) Inventors: Ramiro Liscano, Ottawa (CA); Victor Azondekon, Hull (CA); Michel Barbeau, Ottawa (CA)

(73) Assignee: Mitel Networks Corporation (CA)

( * ) Notice: Subject to any disclaimer, the term of this patent is extended or adjusted under 35 U.S.C. 154(b) by 1069 days.

(21) Appl. No.: 10/281,700

(22) Filed: Oct. 28, 2002

(65) Prior Publication Data
US 2003/0086392 A1    May 8, 2003

(30) Foreign Application Priority Data
Nov. 6, 2001    (GB)    ................... 0126650.1

(51) Int. Cl.
*H04Q 7/00*    (2006.01)
(52) U.S. Cl. ....................... 370/329; 370/349
(58) Field of Classification Search ................ 370/329, 370/254, 346, 349
See application file for complete search history.

(56) References Cited

U.S. PATENT DOCUMENTS 6,862,594 B1 *    3/2005    Saulpaugh et al. ........... 707/10
6,892,230 B1 *    5/2005    Gu et al. ..................... 709/220
6,970,869 B1 *    11/2005   Slaughter et al. ............. 707/10
7,130,895 B2 *    10/2006   Zintel et al. ................. 709/220
2001/0033554 A1   10/2001   Ayyagari et al.
2003/0036350 A1 *  2/2003   Jonsson et al. ............... 455/41
2003/0061094 A1 *  3/2003   Banerjee et al. ............. 705/14

FOREIGN PATENT DOCUMENTS

CA          2172249       5/1995
WO       WO 01/54347 A2   7/2001

* cited by examiner

*Primary Examiner*—Brian Nguyen
(74) *Attorney, Agent, or Firm*—Jones Day

(57) ABSTRACT

A method of selecting a resource for providing a service from a set of resources on a network, using a mobile device. The method includes the steps of sending a set infrared link message by infrared communication from the mobile device, the set infrared link message including a set of network addresses corresponding to the set of resources, and receiving the set infrared link message at the resource. The method also includes the step of determining if the resource is included in the set of resources and sending a set infrared link confirmation message by infrared communication from the resource to the mobile device. The infrared link confirmation message confirms that the resource is included in the set of resources and provides a network address of the resource.

11 Claims, 5 Drawing Sheets

SYSTEM AND METHOD FOR THE SELECTION OF ELECTRONIC SERVICES FROM A SET OF RESOURCES USING INFRARED COMMUNICATION

FIELD OF THE INVENTION

The present invention relates to Ad Hoc communications and in particular to electronic service selection from a set of resources using wireless communication.

BACKGROUND OF THE INVENTION

A variety of mobile wireless electronic devices are available, including laptop personal computers, personal digital assistants and the like. In many instances, it is useful to connect these mobile devices to a host network for use of various services available on the host network. The facilitation of communication among nomadic or mobile device users is referred to as ad Hoc communications. For ad Hoc communication to occur, a network infrastructure must exist. The network infrastructure can be wireless, wired or a combination. By way of example, a mobile user that is a visitor to a building may wish to connect a personal computer to a host network in the building in order to use the available services. The use of service discovery methods is known to those of skill in the art in order to determine what services are available, or if a particular desired service is available.

Service discovery methods are processes in which a device continuously searches a network (or networks) to which the device is connected to determine what services are available. These services can include, for example, printers, facsimile machines, projectors, cameras, scanners, etc.

There are many existing service discovery protocols known to those of skill in the art, including JINI, Service Location Protocol (SLP), Bluetooth Service Discovery Protocol (SDP), Salutation and UPnP.

Generally, many services that are not useful or practical to a user at a given time are discovered when using conventional service discovery methods. These services may not be useful or can be impractical because they are physically inaccessible.

The available services that are discovered may be narrowed down to those that are relevant by filtering the results so that only a particular type of service is visible. For example, when a user chooses the File/Print option from the menu of an application, only devices for printing are displayed. Specifying particular features of the service desired can further narrow the visible discovered services. In the above example, for instance, a user may narrow the printers displayed to only those printers that are capable of printing in color.

When available services have been narrowed to those that are relevant, the user must then determine which services are physically accessible. There is no indication of the proximity of the user to the service and further, there is no association between the service name and the physical device. Returning to the example of the printers, there is no indication of the proximity of the user to the printer and there is no association between service name and the printer in order to aid in selection of an accessible or convenient printer.

The host network may be a fixed network or a wireless ad hoc network. A wireless ad hoc network refers to a network that is dynamically set up and torn down using dynamically created routing tables to accommodate the mobile devices that are connected and disconnected from the network. For wireless ad hoc networks, RF technology is generally employed because it passes through physical objects (it is not affected by physical objects) and due to its' broad beam transmission characteristics. While there are many advantages of the apparent transparency of physical objects to RF, this can be a problem for service discovery as all services within communication range are discovered. This can include inaccessible services such as devices located in other rooms, on other floors, or even in other buildings.

Accordingly, it is an object of an aspect of the present invention to provide a system and method for selecting an electronic service from a set using infrared communication.

SUMMARY OF THE INVENTION

According to one aspect of the present invention, there is provided a method of selecting a resource for providing a service from a set of resources on a network. The method includes the steps of receiving a set infrared link message at the resource by infrared communication, the set infrared link message including a set of network addresses corresponding to the set of resources and determining if the resource is included in the set of resources. The method also includes the step of sending a set infrared link confirmation message by infrared communication, the infrared link confirmation message confirming that the resource is included in the set of resources and providing a network address of the resource.

According to another aspect of the present invention, there is provided a method of selecting a resource for providing a service from a set of resources, using a mobile device. The method includes the steps of sending a set infrared link message by infrared communication, the set infrared link message including a set of network addresses corresponding to the set of resources and receiving a set infrared link confirmation message confirming that the resource is included in the set of resources and providing a network address of the resource.

BRIEF DESCRIPTION OF THE DRAWINGS

The invention will be better understood with reference to the drawings, and following description, in which.

DETAILED DESCRIPTION OF PREFERRED EMBODIMENTS

Figure 1:
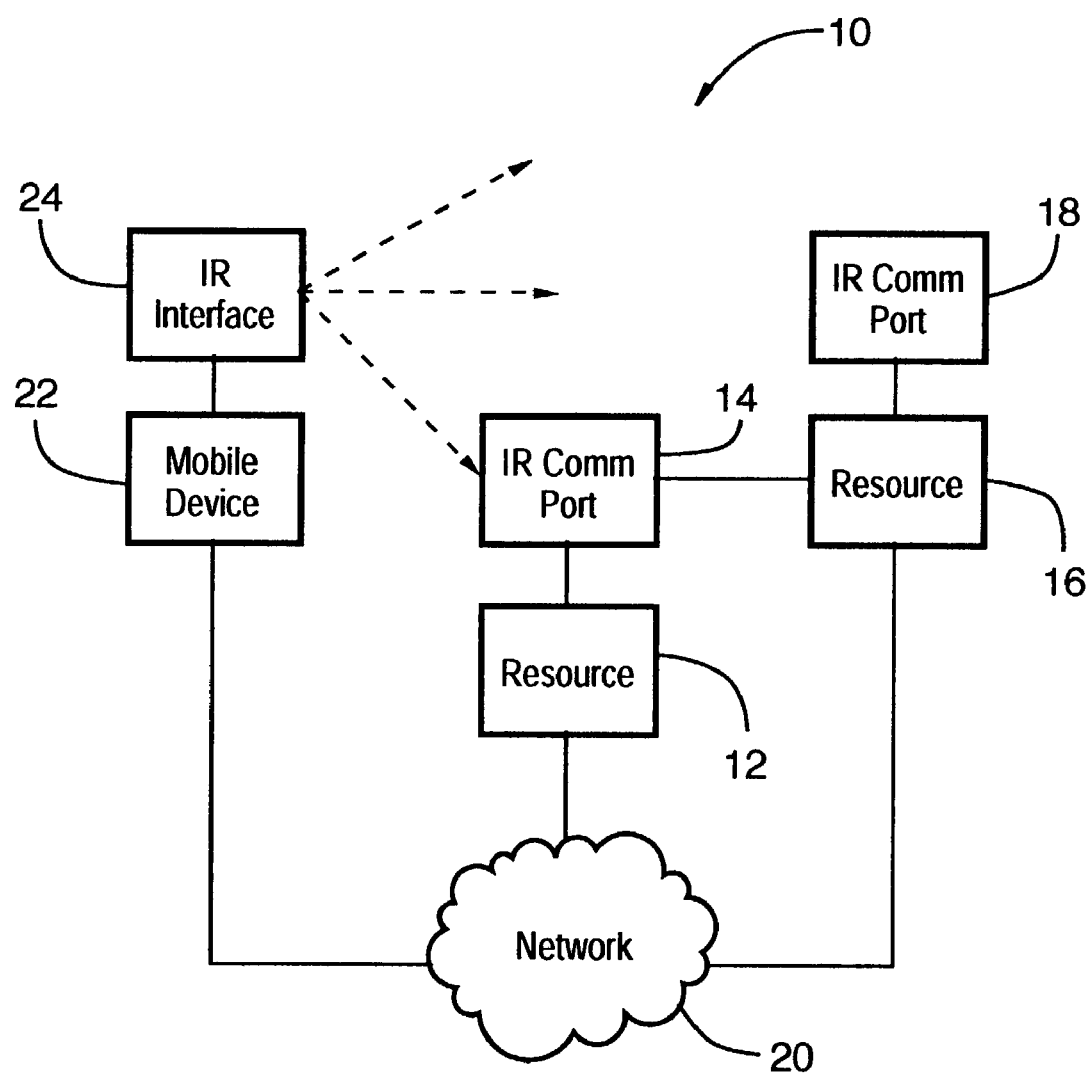
FIG. 1 is a block diagram of a system for selecting a service from a set of resources according to an embodiment of the present invention.

Reference is first made to FIG. 1 to describe a system for selecting an electronic service from a set of services, indicated generally by the numeral 10. In the present embodiment, system 10 has a first resource 12 that includes a device that has an infrared (IR) communication port 14. The system also has a second resource 16 that includes a device that has an IR communication port 18. A network 20 connected to the first and second resources 14, 16, respectively. A portable electronic device 22, referred to as mobile device 22, is connected to the network 20 and includes an IR interface 24. Thus the first resource 12, second resource 16 and mobile device 22 are interconnected through the network 20.

The mobile device 22 also includes a microprocessor, an input device, random access memory, read-only memory, a persistent storage device, and a network interface card.

The first resource 12 is operable to send and receive data through the IR communication port 14 using an infrared communication channel IRCC. Similarly, the second resource 16 is operable to send and receive data through the IR communication port 18 using an infrared communication channel IRCC. The mobile device is operable to send and receive data through the IR interface 24 using wide-angle IP light emitting diodes. The data is sent and received using low data rate low cost, infrared technology, known to those of skill in the art. Each of the first resource 12, second resource 16 and mobile device 22 are operable to send and receive data through the network 20.

The mobile device includes a consumer application for which one of the resources 12, 16 is required to complete a job.

Figure 2A:
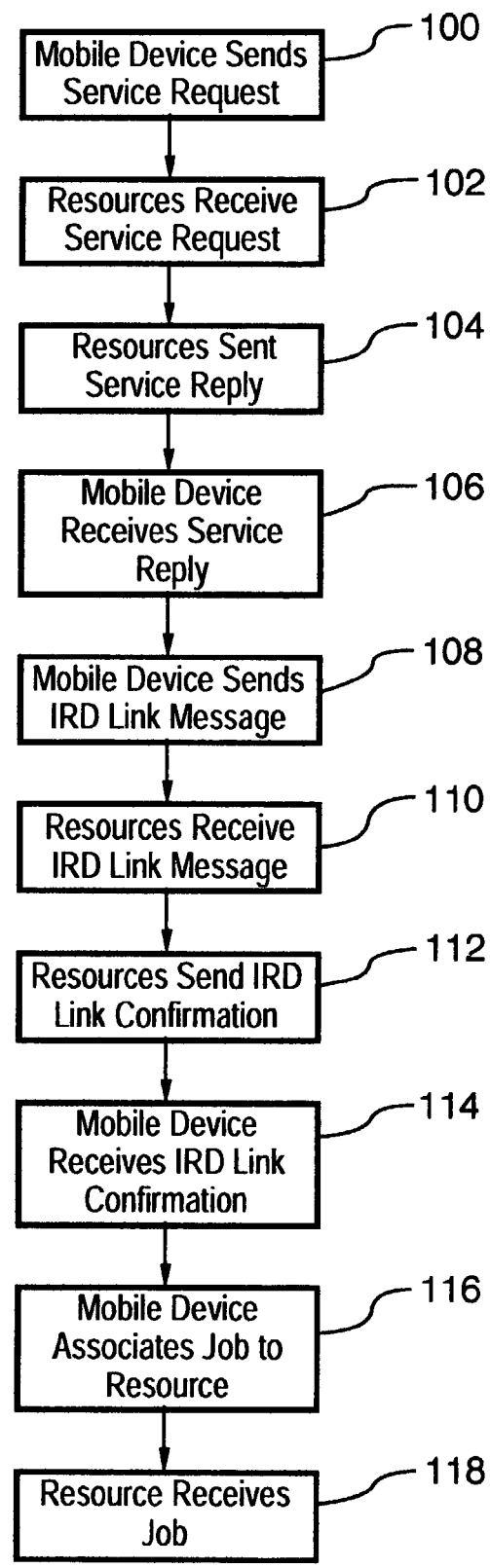
FIG. 2A is a flow chart of a method for selecting a service from a set of resources according to an embodiment of the present invention.
Figure 2B:
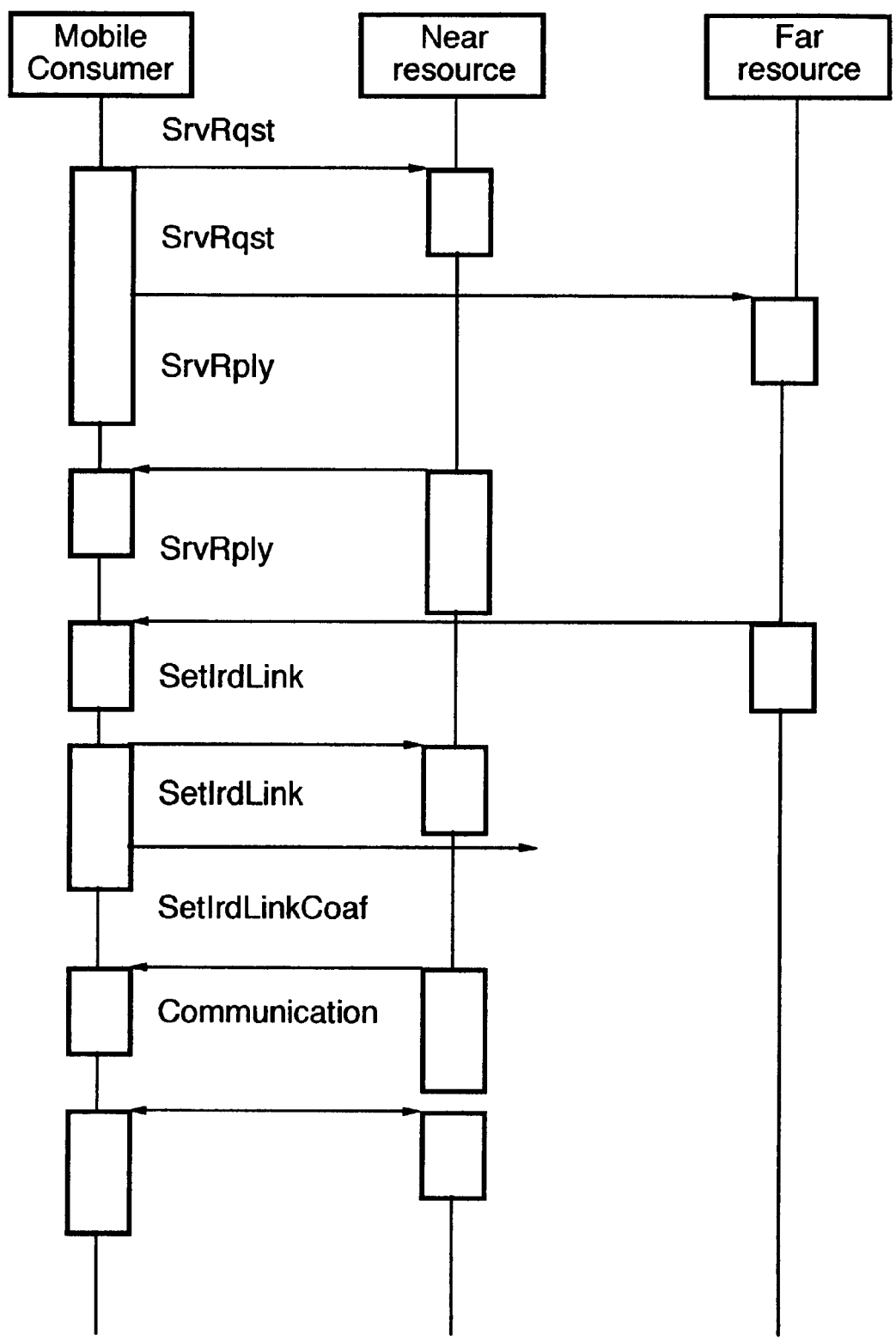
FIG. 2B is a sequence diagram of the method for selecting a service from a set of resource of FIG. 2A following the ODP (Open Distributed Processing) principle of viewpoints (ITU-T Recommendations X901 to X905|ISO/IEC 10746), and using UML (Unified Modeling Language) object-oriented methodology notations.

Referring now to FIGS. 2A and 2B, at step 100 a service request message (SrvRqst) is sent by the mobile device 22. The service request is available through a conventional service discovery protocol known to those of skill in the art, such as JINI, SLP, SDP, Salutation or UPnP. The service request includes a network address of the mobile device 22 and a condition on the properties of the resource. For a printer resource, for example, a typical property condition can be color printing operability (color=yes). In the present embodiment, it is determined that the first and second resources 12, 16, respectively, are available and the network address of the mobile device 22 is an IP address.

At step 102, the resources 12, 16 receive the service request sent by the mobile device 22. Both the first and second resources 12, 16, respectively, are capable of providing the service requested in the service request.

Because both resources 12 and 16 provide the service requested by the mobile device 22, both resources 12, 16 reply to the service request at step 104 by sending a unicast service reply message (SrvRply) to the IP address of the mobile device 22. Each service reply includes a network identifier (IP address) for the respective resource, 12, 16 and information required to access the respective resource (an access point), for example, a uniform resource locator (URL). It is to be understood that if a resource does not provide the particular service requested by the mobile device 22, no service reply is sent from that resource to the mobile device 22.

At step 106, the mobile device 22 receives each service reply.

In order to choose one of the resources 12, 16, the mobile device 22 sends a set infrared link message (SetIrdlink) from the infrared interface 24 using the infrared transmission medium at step 108. The infrared link message is sent to all resources 12, 16, and includes a list of network addresses corresponding to the resources 12, 16 that provide the service requested by the mobile device 22.

At step 110, the first resource 12 receives the infrared link message through the IR communication port 14. In the present embodiment the second resource 16 does not receive the infrared link message because the second resource 16 is out of the infrared communication range of the infrared interface 24 of the mobile device 22. It will now be understood that only those resources in the limited range of infrared communication will receive the infrared link message.

At step 112, the first resource 12 determines that it (the first resource 12) is included in the list of network addresses corresponding to the resources 12, 16 that provide the service requested by the mobile device. Therefore the first resource 12 replies to the infrared link message by sending a set infrared link confirmation message (SetIrdLinkConf) to the mobile device 22. It will be understood that if the resource is not included in the list of network addresses, then the resource does not send a set SetIrdLinkConf message. The set infrared link confirmation message is sent from the infrared communication port 14 to the IR interface 24 of the mobile device 22. The set infrared link confirmation message includes the network address of the resource 12 for resource address verification. If more than one resource received the infrared link message, each resource that received the message responds by sending a set infrared link confirmation message.

The mobile device 22 receives the set infrared link confirmation message at step 114 and confirms the network address of the first resource 12. The mobile device confirms the network address of the first resource 12 by matching the address SetIrdLinkConf message to one of the addresses listed in the SetIrdLink message. The first resource 12 is then associated with the required job at step 116.

Referring to FIG. 2B, the content of the messages of the present embodiment is summarized below. The format for this is MessageName {Value1, Value2, . . . }. The invention does not assume that it is implemented using a particular service discovery protocol like SLP or Jini, but the terminology and functionality of some of the message names conform to those used in SLP.

A typical SrvRqst (service request message) would include a sender address, a destination address, a service descriptor, and a set of predicates that need to be evaluated by the receiver in order to determine if it should respond to the SrvRqst message.

SrvRqst {Mobile Device Address, Resource Address, Resource Descriptor, Predicates, . . . }
  Resource Descriptor—A description of the resource requested.
  Predicates—A condition on the properties of a resource.
SrvRply {Mobile Device Address, Resource Address, Resource Access Point, . . . }
  Resource Address—An identifier for the resource device on the network (commonly an IP address).
  Resource Access Point—Information required to access the resource (In SLP it is specified as a URL, In Jini it is an interface object).
SetIrdLink {List of Resource Addresses, . . . }
  List of Resource Addresses—A list of the addresses of the resources that replied to the SrvRqst.
SetIrdLinkConf {Resource Address Verification, . . . }
  Resource Address Verification—Resource network address.

At step 118, the job is sent from the mobile device 22, through the network 16 to the resource 12 using the access point provided in step 104.

Figure 3:
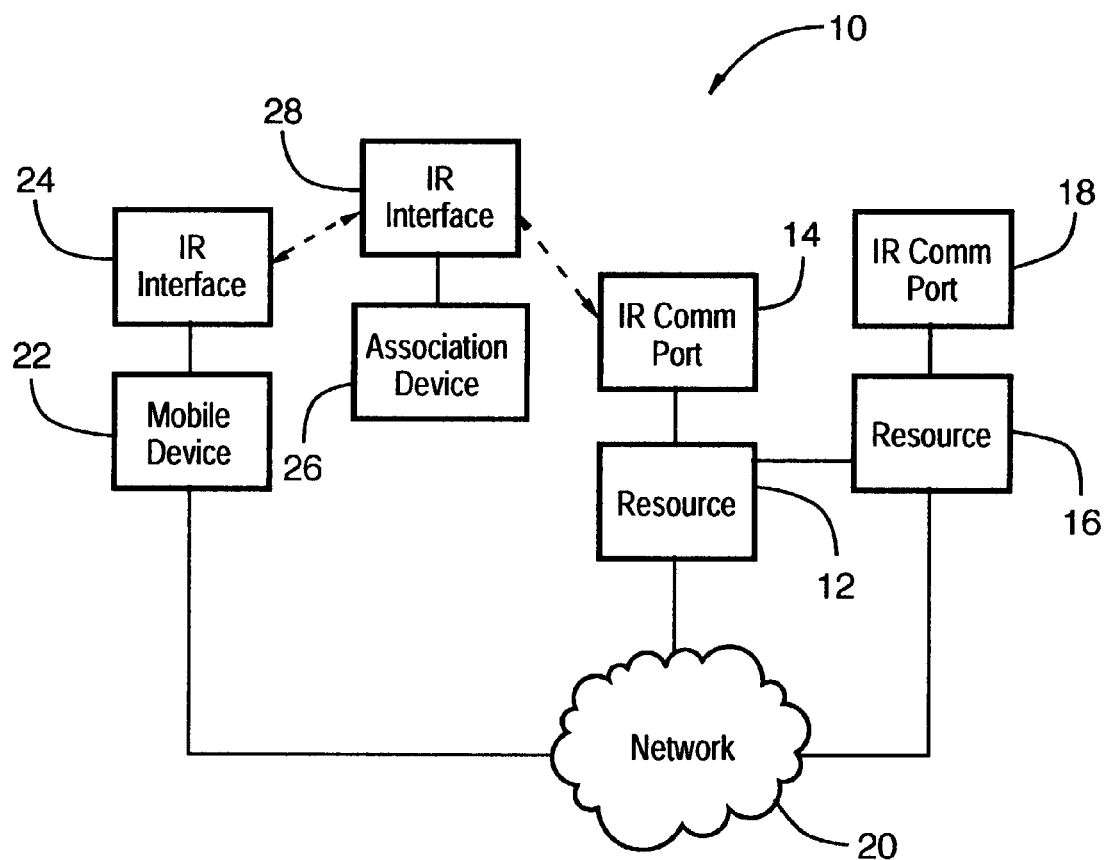
FIG. 3 is a block diagram of a system for selecting a service from a set of resources according to a second embodiment of the present invention.

Reference is now made to FIG. 3 to describe a second embodiment of the present invention, in which the mobile device 22 is not easily transported near the resources 12, 16. For example, a laptop computer may be set up at a docking port providing network access and cannot be easily moved while still plugged into the network 20.

Similar to the first embodiment, system 10 of the present embodiment has a first resource 12 that includes a device that has an infrared (IR) communication port 14. The system also has a second resource 16 that includes a device that has an IR communication port 18. A network 20 connected to the first and second resources 14, 16, respectively. A portable electronic device 22, referred to as mobile device 22, is connected to the network 20 and includes an IR interface 24. Thus the first resource 12, second resource 16 and mobile device 22 are interconnected through the network 20. The system 10 also has an association device 26 that includes an IR interface 28. The association device 26 is a portable device such as a personal digital assistant (PDA).

Each of the mobile device 22 and resources 12, 16 operable to send and receive data, similar to the first embodiment. However, the mobile device 22 is not easily transported. Therefore, the association device 26 is provided as an intermediate device between the mobile device 22 and the resources 12, 16. The association device 26 is operable to send and receive data through the IR interface 28.

Figure 4:
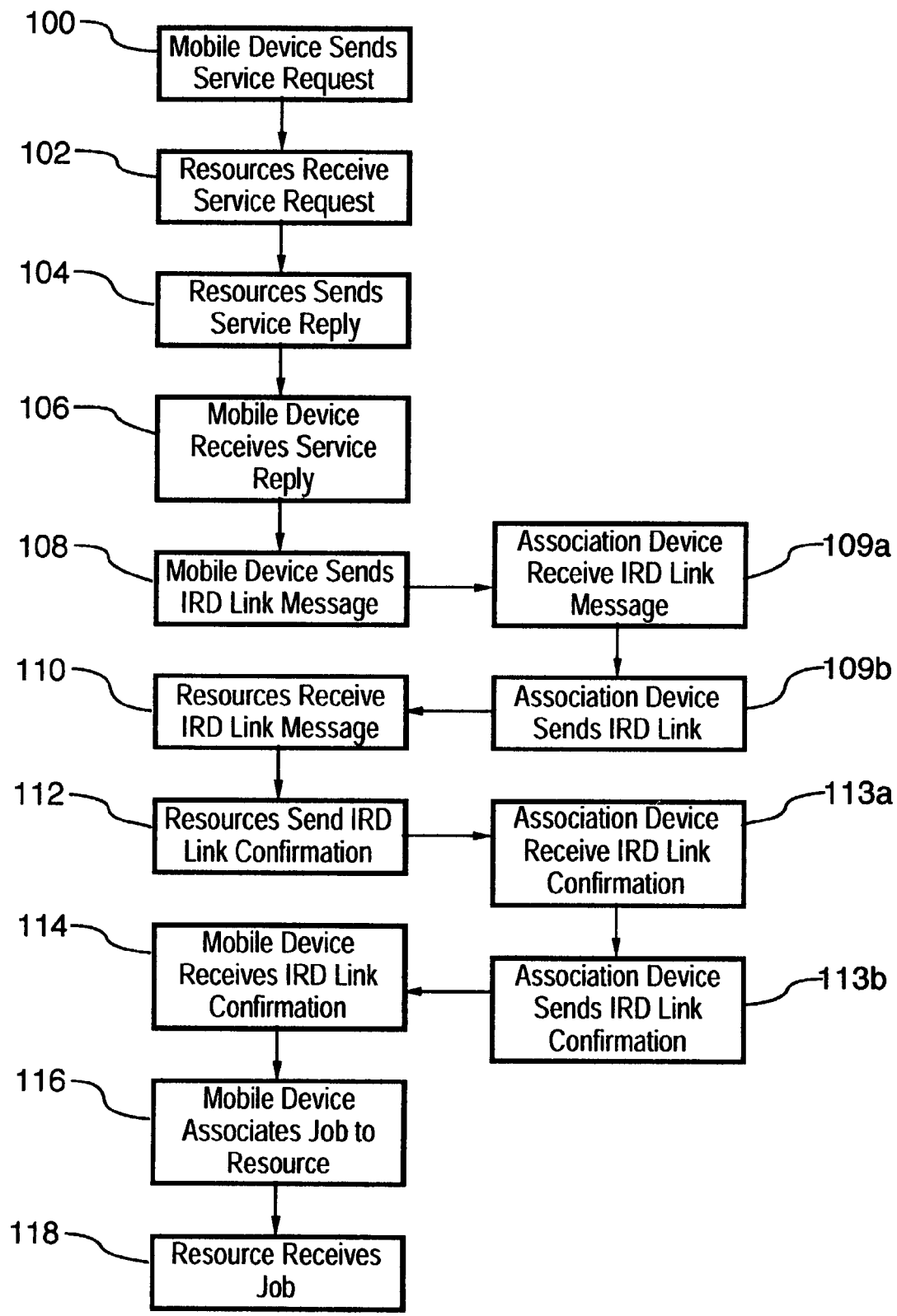
FIG. 4 is a flow chart of a method for selecting a service from a set of resources according to the second embodiment of the present invention.

Referring now to FIG. 4, steps 100 to 106 are similar to steps 100 to 106 of the first-described embodiment.

In order to choose one of the resources 12, 16, the mobile device 22 sends a set infrared link message (SetIrdlink) from the infrared interface 24 using the infrared transmission medium at step 108. In the present embodiment, the infrared link message is sent to the IR interface 28 of the association device 26. The content and format of the SetIrdlink message of the present embodiment is similar to that of the first-described embodiment.

At step 109a, the association device 26 receives the infrared link message from the mobile device 22. It will be understood that the association device 26 is within infrared communication range of the mobile device 22 in order to receive the infrared link message.

At step 109b, the association device 26 is moved within infrared communication range of the first resource 12 and the infrared link message is sent from the IR interface 28 of the association device 26 to the IR communication port 14 of the first resource 12.

At step 110, the first resource 12 receives the infrared link message through the IR communication port 14. The second resource 16 does not receive the infrared link message because the second resource 16 is out of the infrared communication range of the infrared interface 28 of the association device 26.

At step 112, the first resource 12 replies to the infrared link message by sending a set infrared link confirmation message (SetIrdLinkConf) to the association device 26. The set infrared link confirmation message is sent from the infrared communication port 14 to the IR interface 28 of the association device 22. The set infrared link confirmation message content and format is similar to that of the first-described embodiment and therefore includes the network address of the resource 12 for resource address verification. If more than one resource received the infrared link message, those resources that received the message respond by sending the set infrared link confirmation message.

At step 113a, the association device 26 receives the SetIrdLinkConf message through the IR interface 28. It is to be understood that the association device 26 is within infrared communication range of the first resource 12 in order to receive the SetIrdLinkConf message.

At step 113b, the association device 26 is moved to a position within infrared communication range of the mobile device 22 and the infrared link message is sent from the IR interface 28 of the association device 26 to the interface 24 of the mobile device 22.

Similar to the first-described embodiment, the mobile device 22 receives the set infrared link confirmation message in step 114 and confirms the network address of the first resource 12. The first resource 12 is then associated with the required job at step 116.

At step 118, the job is sent from the mobile device 22, through the network 16 to the resource 12 using the access point provided in step 104.

It is contemplated that the present invention can be applied to any system where it is necessary to associate an application to a resource where the application is operable to determine the available service, for example using a service request. A mobile user can apply the present invention to the use of telephony resources. For example, a mobile user that receives notification of incoming calls on a PDA can employ the present invention. The PDA determines the telephony resources in the vicinity and when an incoming call is received, the user determines the nearest telephone equipped with an IR port and points the PDA to that telephone. The set infrared link command is executed and, if the telephone resource is on the list of available resources, a SetIrdLinkConf message is received. At this point, the user has the necessary identification information to forward the call to the telephone.

The present invention is not limited to telephone systems but can be applied to any resource. For example, the present invention can be used to associate a print job to a particular printer.

While the embodiments discussed herein are directed to particular implementations of the present invention, it will be apparent that variations and modifications to these embodiments are within the scope of the invention as defined solely by the claims appended hereto. For example, the mobile device 22 can be a personal digital assistant, a laptop computer or other portable electronic device. Also, the services can include, for example, printers, facsimile machines, projectors, cameras, scanner and the like.

We claim:

1. A method of selecting a resource for providing a service from a set of resources on a network, the method comprising the steps of:

receiving a set infrared link message at said resource by infrared communication, the set infrared link message including a set of network addresses corresponding to said set of resources;

determining if said resource is included in said set of resources;

sending a set infrared link confirmation message by infrared communication, the infrared link confirmation message confirming that said resource is included in said set of resources and providing a network address for selecting said resource; and selecting said resource for providing said service.

2. The method of selecting a resource for providing a service according to claim 1, further comprising, before the receiving step, the steps of:

receiving a service request from a mobile device; and sending a service reply to a network address of the mobile device, the service reply including information to access the resource.

3. The method of selecting a resource for providing a service according to claim 2 wherein said information to access said resource includes an access point.

4. The method of selecting a resource for providing a service according claim 3 wherein said information to access said resource includes a uniform resource locator (URL).

5. The method of selecting a resource for providing a service according to claim 1, further comprising the steps of:
   receiving the set infrared link message at an association device; and
   sending the set infrared link message from said association device to said resource by infrared communication.

6. The method of selecting a resource for providing a service according to claim 5, further comprising the steps of:
   receiving the infrared link confirmation message from said resource, at said association device; and
   sending the infrared link confirmation message from said association device to a mobile device.

7. The method of selecting a resource for providing a service according to claim 6, wherein said association device is a personal digital assistant.

8. A method of selecting a resource for providing a service from a set of resources, using a mobile device, the method comprising the steps of:
   sending a set infrared link message by infrared communication to said resources, the set infrared link message including a set of network addresses corresponding to said set of resources;
   receiving a set infrared link confirmation message from said resource confirming that said resource is included in said set of resources and providing a network address for selecting said resource; and selecting said resource for providing said service.

9. The method of selecting a resource for providing a service according to claim 8, further comprising, before the sending step, the steps of:
   sending a service request to the set of resources via a network; and
   receiving a service reply at a network address of the mobile device, the service reply including information to access the resource.

10. The method of selecting a resource for providing a service according claim 9 wherein said information to access the resource includes a uniform resource locator (URL).

11. The method of selecting a resource for providing a service according to claim 8, further comprising the step of associating a job to the resource.

* * * * *